(12) United States Patent
Seekell

(10) Patent No.: US 11,027,414 B2
(45) Date of Patent: Jun. 8, 2021

(54) LINE HOLDER

(71) Applicant: Robert Seekell, Kuna, ID (US)

(72) Inventor: Robert Seekell, Kuna, ID (US)

( * ) Notice: Subject to any disclaimer, the term of this patent is extended or adjusted under 35 U.S.C. 154(b) by 0 days.

(21) Appl. No.: 16/872,174

(22) Filed: May 11, 2020

(65) Prior Publication Data

US 2021/0101277 A1    Apr. 8, 2021

Related U.S. Application Data

(63) Continuation-in-part of application No. 16/824,248, filed on Mar. 19, 2020, which is a continuation-in-part of application No. 16/595,447, filed on Oct. 7, 2019, now abandoned, and a continuation-in-part of application No. 16/719,800, filed on Dec. 18, 2019.

(51) Int. Cl.
| | |
|---|---|
| *H02G 1/04* | (2006.01) |
| *B25J 1/04* | (2006.01) |
| *H02G 1/02* | (2006.01) |
| *B25J 15/00* | (2006.01) |

(52) U.S. Cl.
CPC ............. *B25J 1/04* (2013.01); *B25J 15/0014* (2013.01); *H02G 1/02* (2013.01)

(58) Field of Classification Search
CPC .... B25B 1/00; B25B 1/02; B25B 1/04; B25B 5/00; B25B 5/02; B25B 5/04
See application file for complete search history.

(56) References Cited

U.S. PATENT DOCUMENTS

| | | | | |
|---|---|---|---|---|
| 3,739,452 A | * | 6/1973 | Gadberry | F02M 61/14 29/254 |
| 3,820,185 A | * | 6/1974 | Phillips | A47J 37/0786 15/105 |
| 4,483,058 A | * | 11/1984 | Clutter | B25B 27/02 29/254 |
| 6,935,436 B1 | * | 8/2005 | Williston | B23B 31/1078 173/132 |
| 8,069,544 B2 | * | 12/2011 | Sollami | B25D 1/16 29/254 |
| 8,713,773 B2 | * | 5/2014 | Foxx | B60T 17/043 29/270 |
| 2010/0109223 A1 | * | 5/2010 | Mills | B25B 5/04 269/207 |

OTHER PUBLICATIONS

Tallman Equipment Inc., Pole Mount Extension Arms, tallmanequipment.com/products/pole-mount-extension-arms/.
Hubbell Power Systems, Inc., Crossarm Conductor Support, https://www.hubbell.com/hubbellpowersystems/en/Products/Power-Utilities/Tools-Dies-Accessories/Conductor-Suppott/Temp.
Hi-Line Utility Supply Co., Extension Arms, https://www.hilineco.com/api/downloads/51477903?filename=2014%20Hi-Line%20Catalog%20-%20p162-171%20-%20Hot%20Arms%20Gins%20Platfor.

* cited by examiner

*Primary Examiner* — Lee D Wilson
(74) *Attorney, Agent, or Firm* — Scott Swanson; Shaver & Swanson, LLP

(57) ABSTRACT

A nonconductive line holder for repositioning a conductor for a line worker to safely work. The line holder has a head, a shaft, and a base. The head is configured to receive and secure a conductor. The shaft can be adjustable or nonadjustable. The base is configured to attach to a base. The line holder attaches to the base and allows a line worker to adjust the positioning of a conductor within the head.

20 Claims, 6 Drawing Sheets

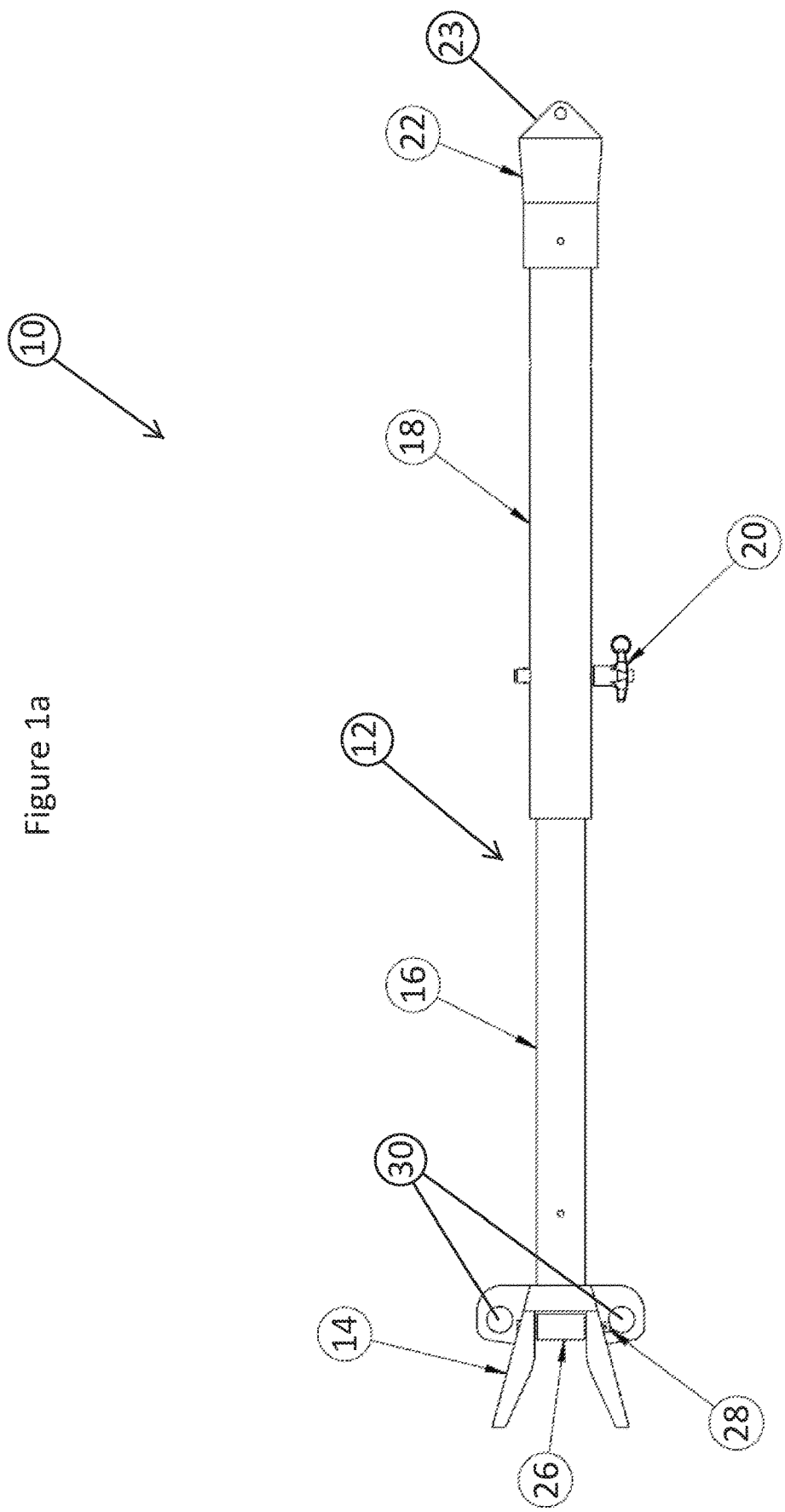

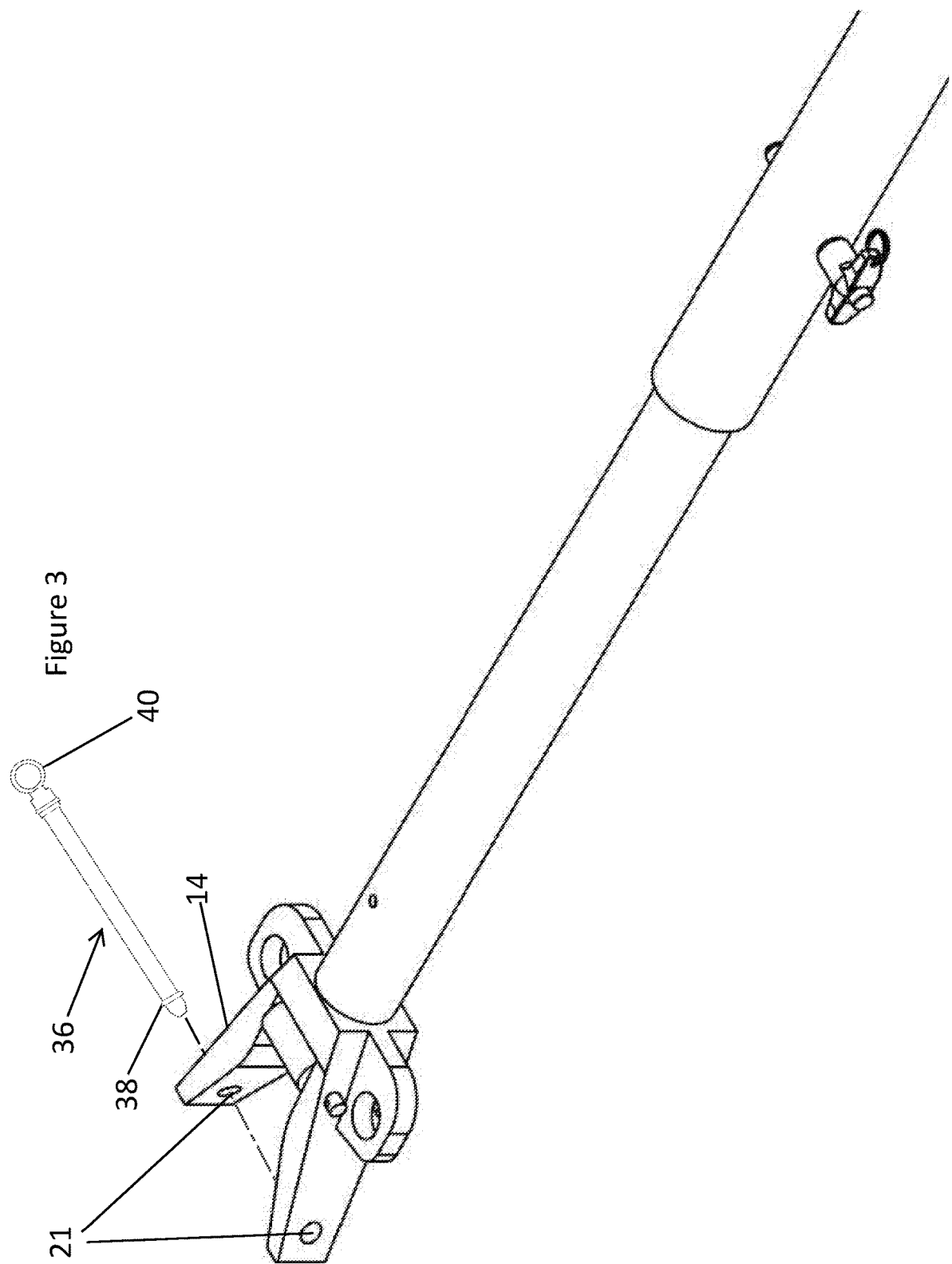

LINE HOLDER

PRIORITY/CROSS-REFERENCE TO RELATED APPLICATIONS

This application is a continuation-in-part and claims the benefit of U.S. Nonprovisional application Ser. No. 16/595,447, filed Oct. 7, 2019, Ser. No. 16/719,800, filed Dec. 18, 2019, and Ser. No. 16/824,248, filed Mar. 19, 2020, the disclosures of which are incorporated by reference.

TECHNICAL FIELD

The presently disclosed technology relates to electrical power distribution work. More particularly it relates to holding energized conductors out of the working space for power line workers.

BACKGROUND

Electrical Power Distribution lines are all over the US. The voltage of a distribution circuit is anywhere from 4K V to 35 KV. The circuits run from pole to pole all over towns, cities, rural areas that deliver power to customers. The distribution circuits come out of a distribution substation where large power transformers step down voltage from high voltage transmission or sub transmission voltage to a distribution voltage (2,300 KV to 34,500 KV). The distribution voltage leaves the substation and travels on energized aluminum or copper conductors normally three or four per circuit on a power pole resting on cross arms or utility arms.

When the line workers need to replace a broken cross arm or insulator that holds the conductors on the pole, sometimes the conductors in the area are energized and can be very dangerous. The energized conductors sit on top of crossarms or utility arms with insulators made of plastic or porcelain. These insulators isolate the conductor from encountering or touching the arm keeping electricity flowing down the line. When a utility company has a broken insulator that needs to be replaced the line workers typically must remove the energized conductor off the insulator while it is still energized and move it out of their working space to change out the insulator or other work tasks. The power companies typically try to keep the conductors energized to continue electricity reaching customers supplied by the conductor that needs to be moved. There have been many cases in the United States were line workers are working too close to an energized conductor and makes accidental contact causing an arc flash. Arc flashes created when this accident occurs have killed and burnt many line workers in the utility industry.

Further, the typical line holders used in the trade today do not allow the conductor to be moved or taken out of the work area. The line holders that are used today are stationary and cannot be moved once they are mounted on the cross arm. Once the conductor is installed in the typical current style of holder there is no way to swing the conductor out of the line workers way. Typical line holders used today do not have any adjustment once a weight is applied in the holder.

In light of the foregoing, there is a need for an improved line holder that safely allows the conductors to be moved out of the work zone for workers safety. With more and more dangerous energized work, line workers need a tool to adjust for different angles of the holder when the conductor is installed inside the holder. What further is needed is a line holder that can adjust for different heights, which also improves the workers clearance from energized conductors being supported. What is further needed is line holder or securement point to hold onto with insulated tools to help get the right amount of safe clearance. Preferably the line holder will have a lightweight, ergonomic design that is nonconductive so it can be used for holding energized or deenergized conductors of different sizes.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

In accordance with the present invention a nonconductive line holder is disclosed that is configured to reposition conductors, including conductors that are energized. In a preferred embodiment, the nonconductive line holder has a nonconductive shaft with a first end attached to a nonconductive head configured for holding a conductor, and a second end preferably having at least one flange configured to attach to a base disclosed in U.S. patent application Ser. Nos. 16/595,447 and 16/719,800. The nonconductive line holder is configured to adjust to different angles on the base. Attaching the nonconductive line holder to the base allows for a line worker to reposition the conductor out of the working area.

In a preferred embodiment, the length of the shaft is configured to adjust. The shaft of the nonconductive line holder preferably utilizes at least two fiberglass tubes configured to telescope for length adjustment. The length is preferably fixed by a pin or any other construction used to fix a length of telescoping tubes. The telescoping shaft preferably is configured to adjust the nonconductive line holder to three feet (3'), four feet (4') and five feet (5'). In alternate embodiments, the shaft is a unitary piece with a set length. In further embodiments, the shaft can telescope to any number of adjusted lengths, including but not limited to, two feet (2'), six feet (6'), etc., or intermediate any combination therein.

In a preferred embodiment, the head is substantially V-shaped and configured to hold a conductor. In alternate embodiments, the head is generally U-shaped.

The head preferably has two securement points or rigging holes outside the v-shaped head. The rigging holes allow for a line worker to utilize tools to hold onto the line holder and adjust the line holder from side to side.

The head preferably includes at least one nonconductive roller attached to the head at or near the valley of the U or V shape. In alternate embodiments, the head can include more rollers, including but not limited to two (2), three (3) or (4) rollers. Increasing the number of rollers reduces the amount of strain on the head and nonconductive holder. In alternate embodiments, the roller can be made of a conductive material.

In a preferred embodiment, a pin is configured to attach through both distal ends of the head, securing a conductor into the head of the nonconductive line holder.

The head is preferably made of a nonconductive material such as carbon fiber, cast plastic, etc. In alternate embodiments, the head can be made of conductive material.

In other embodiments, the shaft is similarly made of nonconductive material such as carbon fiber, fiberglass, plastic, or any other nonconductive material.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE DRAWINGS

FIG. 1a is a front view of an embodiment of a line holder.

FIG. 1b is a top view of an embodiment of a line holder shown in FIG. 1a.

FIG. 1c is a side view of an embodiment of a line holder shown in FIG. 1a.

FIG. 1d is a perspective view of an embodiment of a line holder shown in FIG. 1a.

FIG. 3 illustrates an exploded view of an embodiment of a line holder and a pin.

DETAILED DESCRIPTION OF THE EXEMPLARY EMBODIMENTS

Figure 1B:
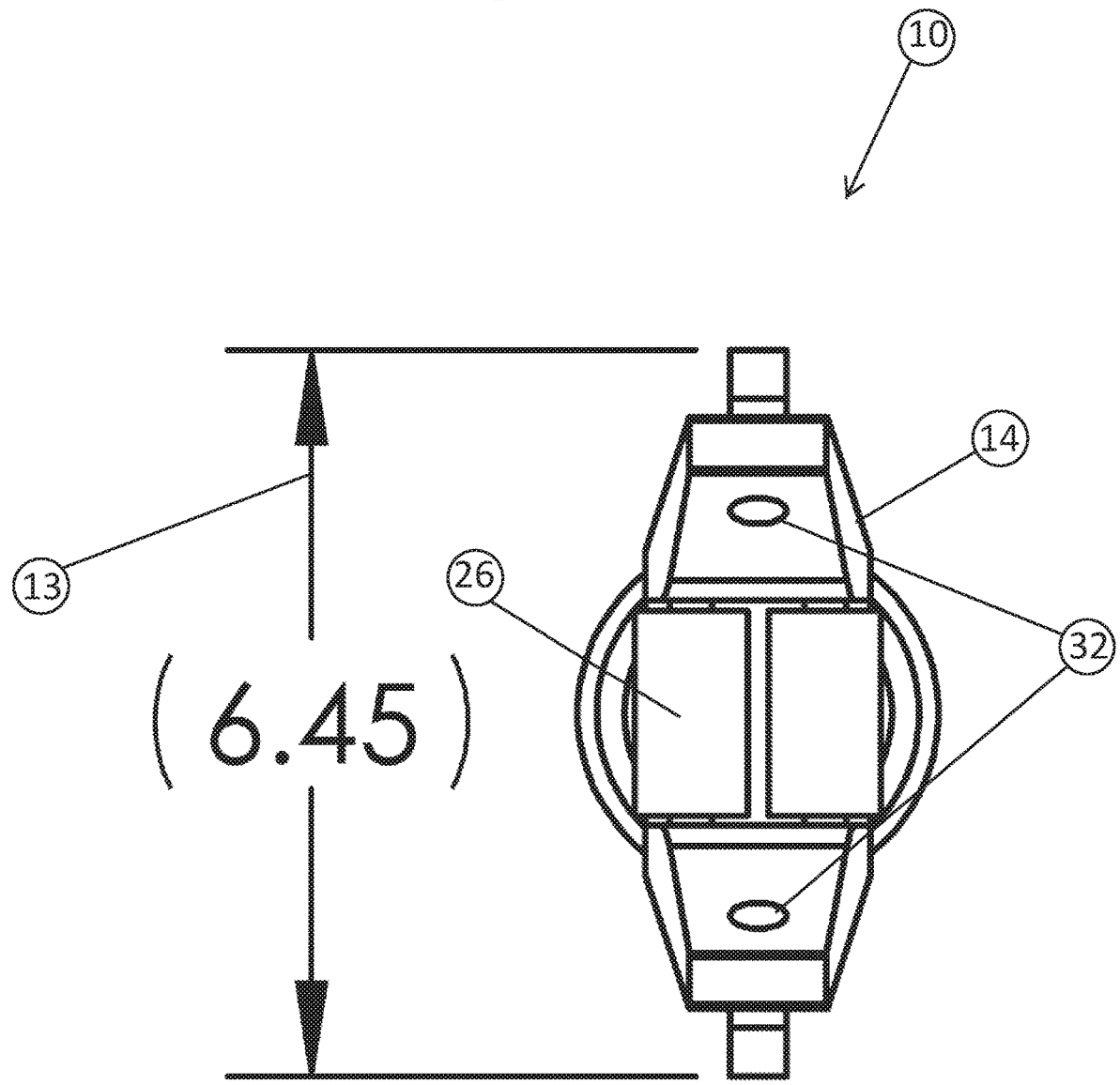

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Embodiments of the inventive concepts disclosed herein can be used to adjust the angle while the conductor is installed making the task safer for the worker. The current invention can be utilized with electrical line or other utility lines including, but not limited to fiber optic lines. Any line that can be run through the roller to provide electricity or conduct a signal is referred herein as a "utility line."

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIGS. 1A-1D illustrate a preferred embodiment of a nonconductive line holder 10 configured to reposition a conductor. The nonconductive line holder 10 has a shaft 12 and a head 14. The head has a forked shape to hold the conductor generally on opposing sides of the conductor such that the conductor can be pulled or pushed laterally through the line holder. The shaft preferably has an upper tube 16 and a lower tube 18 configured to adjust the length of the line holder 10 and the subsequent position of the conductor. The upper tube 16 is configured to telescope within the lower tube 18, or vice versa, to adjust the length of the shaft 12. The upper tube 16 and lower tube 18 define openings 21 configured for a pin 20 to fix the length of the shaft. The openings 21 are preferably positioned such that the length of the line holder 10 can adjust to three feet (3'), four feet (4'), and five feet (5'). In alternate embodiments, the shaft can include additional openings to adjust the length of the line holder to be longer or any intermediate lengths therein.

A nonconductive end 22 is preferably attached to the lower tube 18. The nonconductive end 22 has a flange 23 configured to attach to a base (disclosed in U.S. patent application Ser. Nos. 16/595,447 and 16/719,800) (illustrated in FIG. 2). In alternate embodiments, the flange can be positioned on the side of the shaft or the shaft can include more than one flange configured to attach to the base. The flange 23 allows for a line worker to adjust the position of the conductor in the line holder 10.

The head 14 is configured to receive and retain a conductor. The head 14 preferably includes at least one roller 26 positioned proximate to the shaft. The roller is configured to allow a conductor to be pulled through or pushed through the head when the roller is in rolling engagement with the conductor. As illustrated in FIG. 1B, the head 14 preferably includes two rollers 26. Additional rollers may be utilized to reduce the strain on the head of the line holder and positioned in addition to the roller(s) positioned proximate to the shaft or in lieu of the roller positioned proximate to the shaft.

The head 14 preferably has two rigging holes 30 configured for a line worker to insert tools to safely adjust the position of the line holder 10 and the subsequent position of the conductor therein. In alternate embodiments, the head has one rigging hole.

In a preferred embodiment, the distal ends of the head 14 include openings 32 configured for a pin (illustrated in FIGS. 2-3) to be inserted therein to secure a conductor into the head.

Figure 1C:
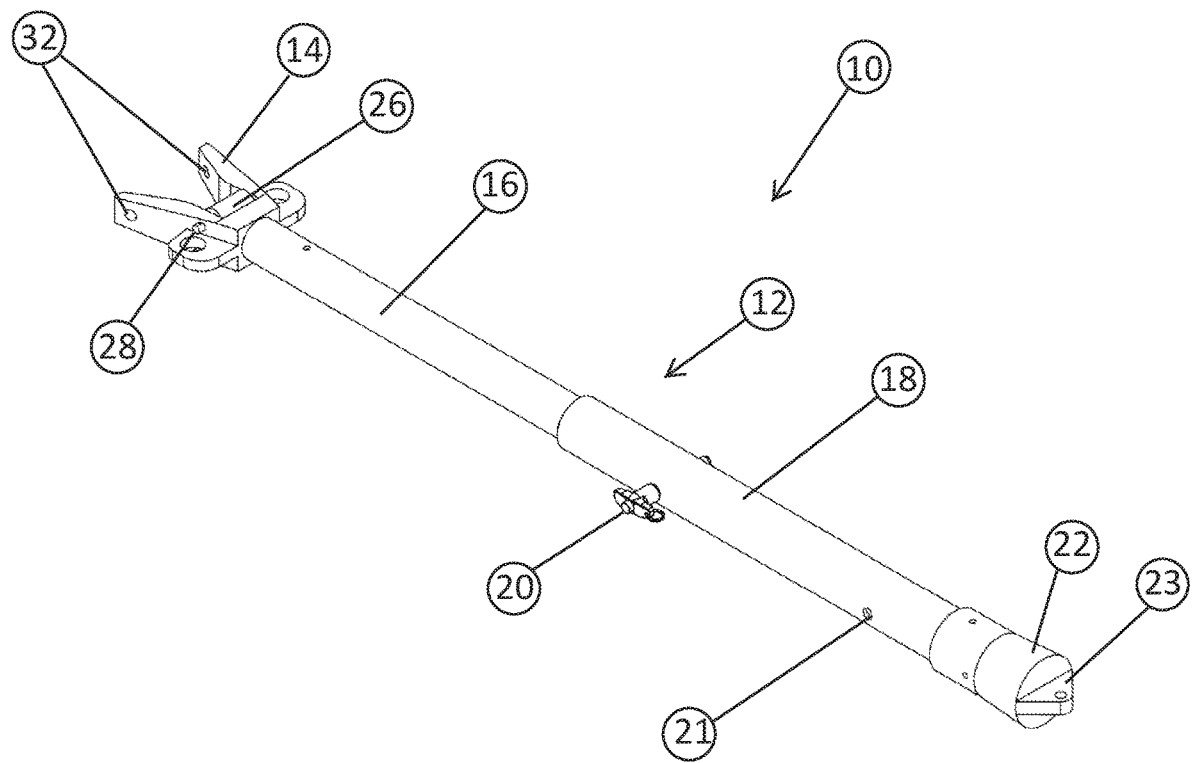

As illustrate in FIGS. 1A, and 1C, the head 14 is substantially V-shaped. In alternate embodiments not shown, the head is generally U-shaped, V-shaped or similar shape configured to receive and retain a conductor in a valley or depression in the head.

Figure 1D:
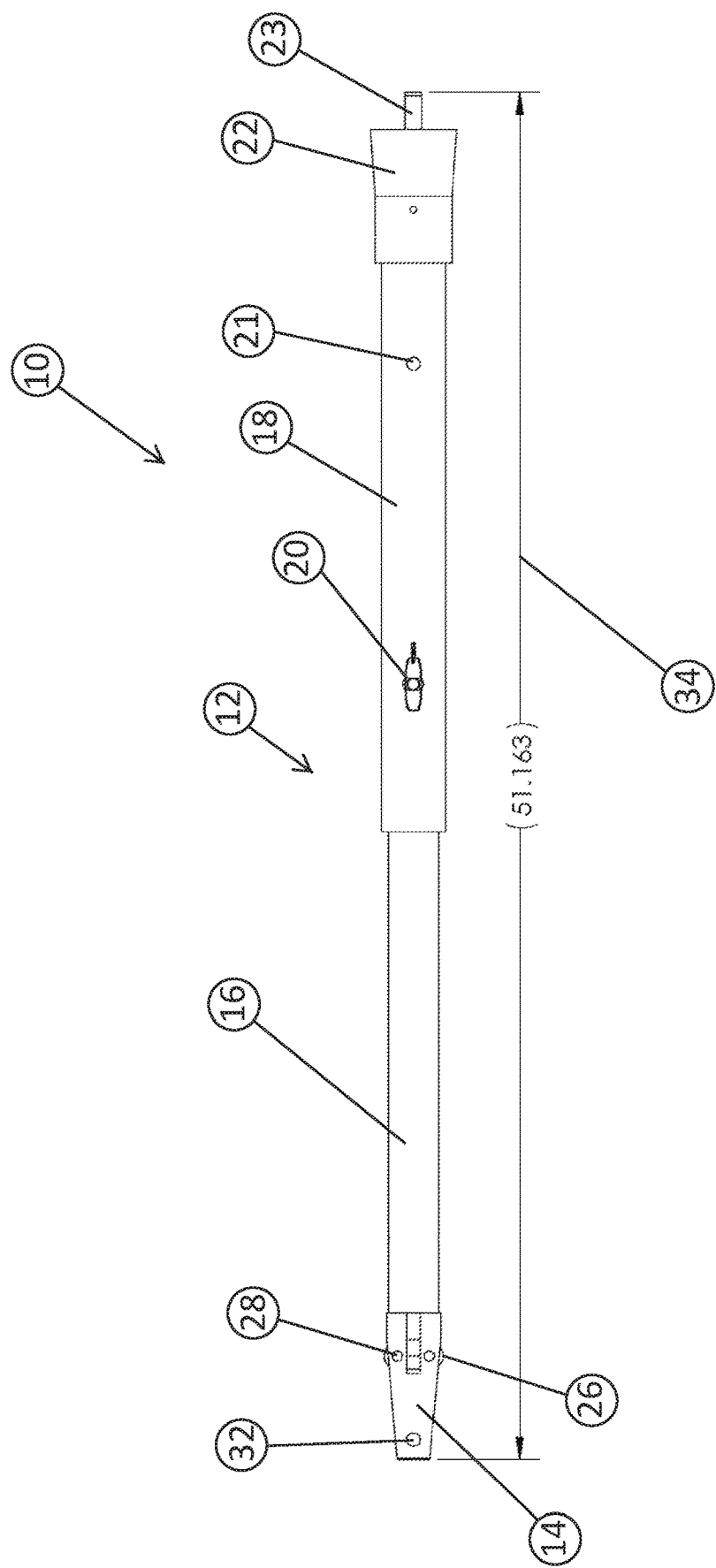

As illustrated in FIG. 1D, the line holder 10 preferably adjusts to a length 34 of at least fifty-one inches (51"). In alternate embodiments discussed above, the line holder can extend longer, including but not limited to five feet (5') or six feet (6').

Figure 2:
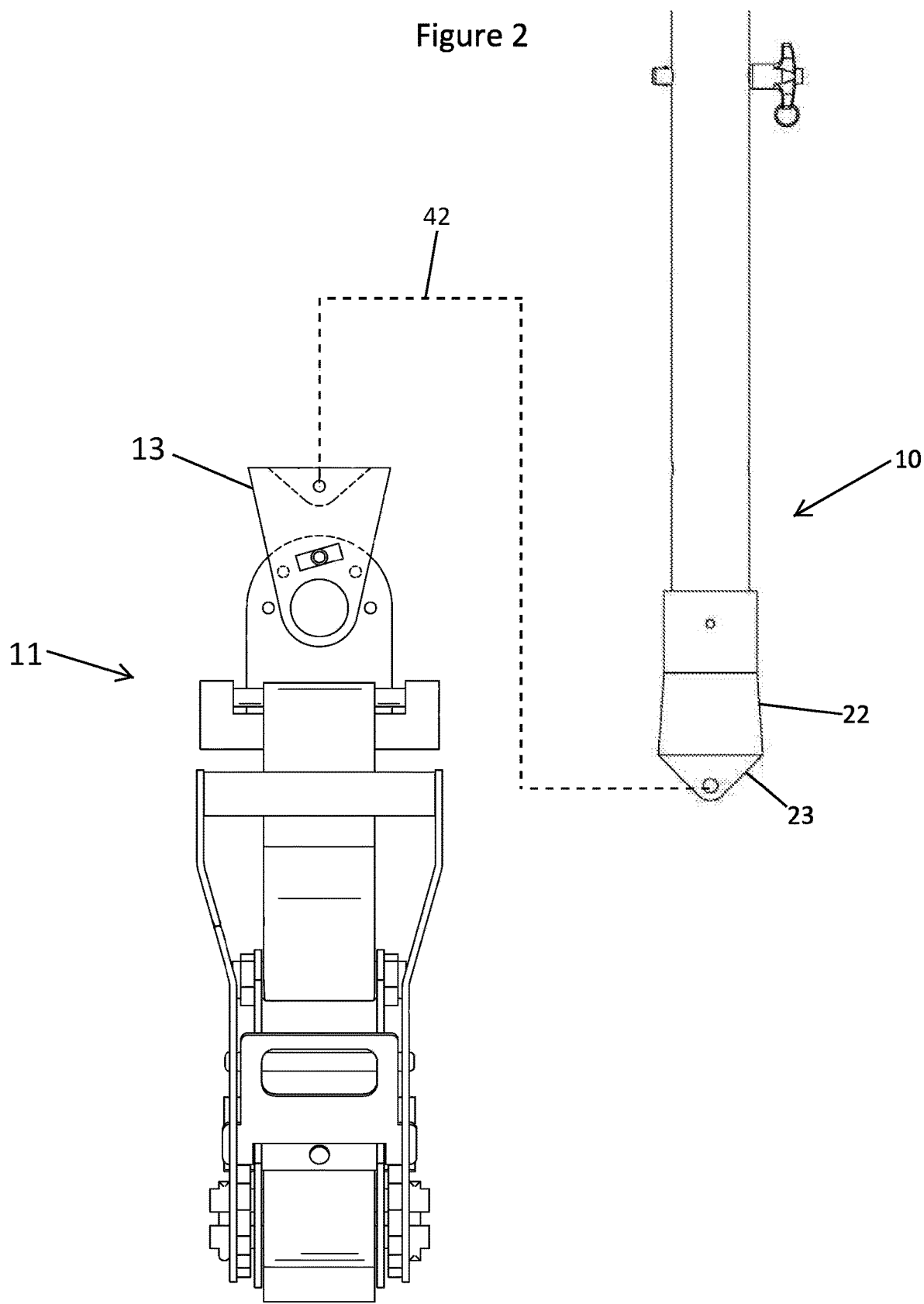
FIG. 2 is an exploded view of an embodiment of a line holder and a base.

FIG. 2 illustrates an exploded view of the line holder 10 configured to attach 42 to the base 11 (disclosed in U.S. patent application Ser. Nos. 16/595,447 and 16/719,800). The flange 23 of the end 22 is configured to insert into the socket 13 of the base 11. The opening in the socket 13 is configured to receive a pin thereto to attach the flange 23 to the base 11.

FIG. 3 illustrates a pin 36 inserted into the openings 21 in the distal end of the head 14. The pin 36 is configured to secure a conductor in the head 14 so a line worker can safely work without the conductor interfering or injuring the line worker. The pin is preferably constructed from nonconductive material such as nylon plastic. The pin can be rigid as depicted or fabricated in alternative embodiments, such as incorporating a roller.

The pin 36 preferably includes an aluminum cap attached to a weld ring 40. The weld ring 40 is configured to provide a user with a handle or other tool to insert the pin 36 into openings 21. In alternate embodiments, other handle constructions can be used.

The pin 36 is preferably secured into the openings 21 by a button spring 38. In alternate embodiments, other pin constructions can be utilized to secure the pin 36, including but not limited to cotter pins.

In a preferred embodiment, the shaft 12, head 14, and end 22 are constructed of a nonconductive material. In alternate embodiments, the head, or end, or both are constructed of conductive material, so long as an energized conductor cannot interfere or injure a line worker. The nonconductive materials include, but are not limited to, fiberglass, carbon fiber, cast plastic, etc.

In alternate embodiments, the shaft is constructed of a single molded piece with a fixed length.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A nonconductive line holder for repositioning a conductor, wherein said nonconductive line holder comprises:
    a shaft, said shaft having a first end and a second end;
    a head including at least two projections being spaced apart attached to said first end of said shaft, wherein said head is configured to receive and retain a conductor;
    wherein said second end comprises at least one flange, wherein said at least one flange is configured for attaching to a base, wherein the base is configured for mounting to a pole and configured to allow for pivoting adjustment of said line holder within said pole to adjust an angle of said line holder extending from said base, wherein said line holder is nonconductive so as to be configured to hold an energized conductor in said head.

2. The nonconductive line holder of claim 1, wherein said shaft comprises a first tube and a second tube, wherein said first tube and said second tube are configured to telescope to adjust the length of said shaft.

3. The nonconductive line holder of claim 1, wherein said head further comprises at least one roller, wherein said roller is configured for rolling engagement with a conductor positioned within said head.

4. The nonconductive line holder of claim 1, wherein said head further defines openings at the distal ends of said head; and
    a pin, wherein said pin is configured to be inserted through said openings to secure said conductor in said head.

5. The nonconductive line holder of claim 1, wherein said head comprises at least one rigging hole, wherein said at least one rigging hold is configured to attach a tool for a user to adjust the positioning of said nonconductive line holder.

6. The nonconductive line holder of claim 1, wherein said shaft comprises a nonconductive material.

7. The nonconductive line holder of claim 1, wherein said head comprises a forked shape.

8. The nonconductive line holder of claim 7, wherein said head comprises a shape from the group consisting of a U-Shape and a V-Shape.

9. A nonconductive line holder for repositioning a conductor, wherein said nonconductive line holder comprises:
    a shaft, said shaft having a first end and a second end, wherein said shaft comprises a first tube and a second tube, wherein said first tube and said second tube are configured to telescope to adjust the length of said shaft;
    a head attached to said first end of said shaft, wherein said head is configured to receive and retain a conductor, wherein said head further comprises at least one roller positioned proximate to said shaft, wherein said roller is configured to allow a conductor to move within said head;
    wherein said second end comprises at least one flange, wherein said at least one flange is configured for attaching to a base.

10. The nonconductive line holder of claim 9, wherein said head further defines openings at the distal ends of said head, wherein said openings are configured for a pin to be inserted to secure said conductor in said head.

11. The nonconductive line holder of claim 9, wherein said head comprises at least one rigging hole, wherein said at least one rigging hold is configured to attach a tool for a user to adjust the positioning of said nonconductive line holder.

12. The nonconductive line holder of claim 9, wherein said head comprises at least two rollers.

13. The nonconductive line holder of claim 9, wherein said nonconductive line holder comprises a nonconductive material.

14. The nonconductive line holder of claim 9, wherein said shaft comprises a nonconductive material.

15. The nonconductive line holder of claim 9, wherein said head comprises a nonconductive material.

16. A nonconductive line holder for repositioning a conductor, wherein said nonconductive line holder comprises:
- a shaft, said shaft having a first end and a second end, wherein said shaft comprises a first tube and a second tube, wherein said first tube and said second tube are configured to telescope to adjust the length of said shaft;
- a head attached to said first end of said shaft, wherein said head is configured to receive and retain a conductor, wherein said head further comprises at least one roller positioned proximate to said shaft, wherein said roller is configured to allow a conductor to move within said head;
- wherein said second end comprises at least one flange, wherein said at least one flange is configured for attaching to a base;
- wherein said head comprises at least two rigging holes, wherein said rigging holes are positioned on opposite sides of said head, wherein said at least two rigging holes are configured to attach a tool for a user to adjust the positioning of said nonconductive line holder;
- wherein the distal ends of said head comprise pin holes, wherein a pin is configured to insert into said pin holes to secure said conductor into said head.

17. The nonconductive line holder of claim 15, wherein said head comprises two rollers.

18. The nonconductive line holder of claim 15, wherein said nonconductive line holder comprises a nonconductive material.

19. The nonconductive line holder of claim 15, wherein said shaft comprise a nonconductive material.

20. The nonconductive line holder of claim 18, wherein said shaft comprises fiberglass.

* * * * *